(12) United States Patent
Yangpichit (10) Patent No.: US 9,617,982 B2
(45) Date of Patent: Apr. 11, 2017

(54) SOLAR CHIMNEY WITH EXTERNAL VERTICAL AXIS WIND TURBINE

(76) Inventor: Pitaya Yangpichit, Bangkok (TH)

( * ) Notice: Subject to any disclaimer, the term of this patent is extended or adjusted under 35 U.S.C. 154(b) by 233 days.

(21) Appl. No.: 14/366,091

(22) PCT Filed: Apr. 5, 2012

(86) PCT No.: PCT/TH2012/000015
§ 371 (c)(1),
(2), (4) Date: Sep. 5, 2014

(87) PCT Pub. No.: WO2013/100865
PCT Pub. Date: Jul. 4, 2013

(65) Prior Publication Data
US 2014/0373537 A1  Dec. 25, 2014

(30) Foreign Application Priority Data
Dec. 30, 2011  (TH) ................ 1101003940

(51) Int. Cl.
F03G 6/04       (2006.01)
F01K 23/02      (2006.01)
F03D 9/00       (2016.01)

(52) U.S. Cl.
CPC .............. F03G 6/045 (2013.01); F01K 23/02 (2013.01); F03D 9/007 (2013.01);
(Continued)

(58) Field of Classification Search
CPC .......... F03G 6/045; F01K 23/02; F03D 9/007; Y02E 10/72; Y02E 10/465; F05B 2260/24; Y02B 10/30; Y02B 10/20
(Continued)

(56) References Cited

U.S. PATENT DOCUMENTS 2,112,087 A   3/1938  Golod
2,552,237 A   5/1951  Trombe
(Continued)

FOREIGN PATENT DOCUMENTS

DE   2521588 A1   12/1976
DE   3312977 A1   10/1984
(Continued)

OTHER PUBLICATIONS

U.S. Department of Energy, "CSP Technologies Overview", www.energylan.sandia.gov/sunlab/overview.htm (7 pages).
(Continued)

Primary Examiner — Hoang Nguyen
(74) Attorney, Agent, or Firm — William H. Eilberg (57) ABSTRACT

The solar chimney of the present invention comprises an elongated chamber having an inlet end and an outlet end, the chamber defining a path for fluid, such as air, from the inlet to the outlet. Air updrafts in the chamber drive an internal turbine which is connected to an electric generator, or to some other machine. The chamber has the general configuration of an hourglass; the diameter of the chamber becomes progressively smaller with distance from the inlet end, until the diameter reaches a minimum value, then becomes progressively larger, as one proceeds towards the outlet end. Disposed within the chamber are one or more heat exchangers for heating air in the chamber by solar and/or wind energy.

13 Claims, 8 Drawing Sheets

(52) U.S. Cl.
CPC ........... *F05B 2260/24* (2013.01); *Y02B 10/20* (2013.01); *Y02B 10/30* (2013.01); *Y02E 10/465* (2013.01); *Y02E 10/72* (2013.01)

(58) Field of Classification Search
USPC ........... 60/641.8–641.15, 659, 655, 676, 698
See application file for complete search history.

(56) References Cited

U.S. PATENT DOCUMENTS

| | | | |
|---|---|---|---|
| 2,902,028 A | 9/1959 | Manly | |
| 3,203,167 A | 8/1965 | Green | |
| 3,869,199 A | 3/1975 | Cummings | |
| 3,979,597 A | 9/1976 | Drucker | |
| 4,016,725 A | 4/1977 | Fiss | |
| 4,026,273 A | 5/1977 | Parker | |
| 4,052,134 A | 10/1977 | Rumsey | |
| 4,090,494 A | 5/1978 | Borst | |
| 4,096,698 A | 6/1978 | Martin | |
| 4,154,220 A | 5/1979 | Loth | |
| 4,275,309 A | 6/1981 | Lucier | |
| 4,331,042 A | 5/1982 | Anderson | |
| 4,388,533 A | 6/1983 | Campbell | |
| 4,421,159 A | 12/1983 | Lin | |
| 4,433,544 A | 2/1984 | Wells | |
| 4,434,787 A | 3/1984 | Young | |
| 4,449,515 A | 5/1984 | Nilsson | |
| 4,453,383 A | 6/1984 | Collins | |
| 4,467,788 A | 8/1984 | Peranio | |
| 4,534,335 A | 8/1985 | Rice | |
| 4,706,471 A | 11/1987 | Alexander | |
| 4,723,535 A | 2/1988 | Lew | |
| 4,790,477 A | 12/1988 | Forkin | |
| 4,830,677 A | 5/1989 | Geisler | |
| 5,224,466 A | 7/1993 | Kirchmayer | |
| 5,381,048 A | 1/1995 | Baird | |
| 5,983,634 A * | 11/1999 | Drucker | F03D 1/04 60/398 |
| 6,016,015 A | 1/2000 | Willard | |
| 6,089,021 A | 7/2000 | Senanayake | |
| 6,590,300 B1 | 7/2003 | Preito Santiago | |
| 6,772,593 B2 | 8/2004 | Dunn | |
| 7,026,723 B2 | 4/2006 | Moreno | |
| 7,821,151 B2 | 10/2010 | Le | |
| 7,854,224 B2 | 12/2010 | Yangpichit | |
| 7,856,974 B2 | 12/2010 | Yangpichit | |
| 7,863,765 B2 | 1/2011 | Yang | |
| 7,964,981 B2 | 6/2011 | Tsao | |
| 8,534,068 B2 | 9/2013 | Yangpichit | |
| 2003/0217551 A1 | 11/2003 | Drucker | |
| 2004/0237524 A1 | 12/2004 | Thiagarajan | |
| 2005/0061312 A1 | 3/2005 | Szymocha | |
| 2007/0245730 A1 * | 10/2007 | Mok | F03D 1/04 60/641.8 |
| 2008/0156315 A1 | 7/2008 | Yangpichit | |
| 2008/0314058 A1 | 12/2008 | Jones | |
| 2009/0120091 A1 * | 5/2009 | DuBois | F03D 9/002 60/641.3 |
| 2011/0173980 A1 | 7/2011 | Yangpichit | |
| 2012/0138447 A1 * | 6/2012 | Glynn | B01D 1/0035 202/189 |

FOREIGN PATENT DOCUMENTS

| | | |
|---|---|---|
| DE | 19821659 A1 | 11/1999 |
| DE | 10023424 A1 | 11/2001 |
| DE | 10343544 A1 | 4/2005 |
| EP | 0017105 A1 | 10/1980 |
| EP | 1589221 A2 | 10/2005 |
| EP | 1741927 A1 | 1/2007 |
| EP | 1790918 A1 | 5/2007 |
| EP | 1830061 A2 | 9/2007 |
| FR | 2363711 A1 | 3/1978 |
| FR | 2574863 A1 | 6/1986 |
| FR | 2683864 A1 | 5/1993 |
| FR | 2725501 A3 | 4/1996 |
| FR | 2844561 A1 | 9/2002 |
| FR | 2848616 A1 | 6/2004 |
| GB | 1549452 A | 8/1979 |
| GB | 2062107 A | 5/1981 |
| JP | 57005570 | 1/1982 |
| JP | 57169550 A | 10/1982 |
| JP | 2004100496 A | 4/2004 |
| WO | 01/96740 A1 | 12/2001 |
| WO | 2004/036039 A1 | 4/2004 |
| WO | 2005/100878 A1 | 10/2005 |
| WO | 2005/103581 A1 | 11/2005 |
| WO | 2006/098662 A2 | 9/2006 |
| WO | 2008113124 A2 | 9/2008 |

OTHER PUBLICATIONS

Schlaich et al, "Solar Chimneys", Encyclopedia of Physical Science and Technology, 3rd ed. 2000 (11 pages).

U.S. Department of Energy, "Solar Power Tower", www.energylan.sandia.gov/sunlab/PDFs/solar_tower.pdf (pp. 5-6).

U.S. Department of Energy, "Solar Parabolic Trough", www.energylan.sandia.gov/sunlab/PDFs/solar_trough.pdf (pp. 5-24 through 5-44).

* cited by examiner

Wind flow

Redirected Wind flow

SOLAR CHIMNEY WITH EXTERNAL VERTICAL AXIS WIND TURBINE

TECHNICAL FIELD

The present invention relates to the field of solar chimney with external vertical axis wind turbine has a set of vanes affixed to the ground somewhat below the inlet of the solar chimney to enmesh ambient air. The vanes assist in guiding enmeshed ambient air toward the inlet.

SUMMARY OF INVENTION

The solar chimney with external vertical axis wind turbine of the present invention has a set of vanes affixed to the ground somewhat below the inlet of the solar chimney to enmesh ambient air. The vanes assist in guiding enmeshed ambient air toward the inlet.

The solar chimney also preferably includes a shaft-less external vertical axis wind turbine, mounted for rotation relative and around the solar chimney. The external vertical axis wind turbine captures energy of wind in the surrounding environment. This wind energy is used to generate electrical power, which may be amalgamated with output from the internal turbine, or it can be stored in the wind energy storage system for later use.

Surrounding, concentric with and generally at the same level with the external vertical axis wind turbine is another annular cylindrical cage. Mounted on this outer annular cylindrical cage are a set of vanes redirecting some flow of the wind. The outer annular cylindrical cage is directed windward by a yaw mechanism.

Positioned above the covering of the outer annular cylindrical cage are apertures allowing wind that has given up its energy to exit. The covering is shaped in such a manner that wind flowing over it assists in the venting of wind from the vertical axis wind turbine blades.

The solar chimney includes an inflatable torus which deflects air toward the vanes mounted on the outer annular cylindrical cage.

The solar chimney includes a torus or set of vanes mounted near the outlet end of the elongated chamber deflecting wind blowing across resulting in additional suction to the air flowing upward through the chimney The invention has the primary object of providing a solar chimney in which solar energy heats air in the chimney causing updrafts that can be harnessed to perform useful work.

The invention has the further object of providing a solar chimney with a vertical axis wind turbine external to the chimney, harnessing wind energy in the environment of the chimney, wherein such energy is used to generate power.

The invention has the further object of providing an improved device for harnessing the energy of the sun and wind to do useful work.

The invention has the further object of providing storage for wind and solar energy.

The invention has the further object of improving the efficiency of a solar chimney.

The reader skilled in the art will recognize other objects and advantages of the present invention, from a reading of the following brief description of the drawings, the detailed description of the invention, and the appended claims.

BACKGROUND OF THE INVENTION

Solar chimney in prior art comprises base which is affixed to the ground. The base includes openings which allow ambient air flow into the base. Above the base is elongated chamber through which the airflow from the base moving upward. This elongated chamber slope inward with the distance from its bottom, resulting in higher speed of wind flowing up towards the outlet part of the chamber.

The air flowing upward through the chimney drives turbine which is disposed inside the chamber.

The turbine is connected to gear box and electric generator which are mounted inside the chimney. The gear box contains gears which connect the turbine to the generator, wherein rotation of the wind turbine generates electric power.

Disposed within the chamber are means for heating air in the chamber by solar energy. The heat exchanger located in the chimney is connected by heat transfer conduits to solar collector located external to the chimney, wherein the solar collector transfers heat to the heat exchanger.

Another heat exchanger also located in the chimney receives direct solar radiation from outside the chamber. This heat exchanger receives solar energy which is focused by lens and passes through an opening in the wall of the solar chimney, and impinges on heat exchanger. This heat exchanger functions both as solar collector and heat exchanger. It receives solar radiation and converted to electric power.

Auxiliary burner is a non-solar heat source which is used in the event that there is insufficient solar energy. The burner could be a gas burner, or some other conventional heat source, which heats the air in the chimney instead of the solar collectors/heat exchangers.

The solar chimney in prior art comprising a wind energy storage system, wherein a vertical axis wind turbine, being mounted in a vicinity of the outlet of the chamber, is connected to an air compressor, wherein rotation of the vertical axis wind turbine causes the air compressor to operate, and wherein the air compressor is connected to drive an air-driven motor which is connected to operate the exhaust wind turbine inside the chimney near the outlet end.

The upper half of the elongated chamber slope outward with distance from the most narrow part of the chamber, wherein wind flow from the most narrow part toward the outlet end at the top of the chamber.

The solar chimney of the prior art described above, in which the base includes openings only allow ambient air to flow in to the base. But in the present invention the solar chimney comprises a set of vanes below the inlet or the base, wherein the vanes assist in guiding enmeshed ambient air toward the inlet and flows up spirally in the chimney.

The solar chimney of the present invention also comprises torus at the outlet end of the chimney creating additional suction to the air flowing upward through the chimney.

The solar chimney of the present invention further comprising outer annular cylindrical cage with a set of vanes, surrounding external vertical axis wind turbine and forming a series of duct, resulting to ever higher pressure and faster rotation of the wind turbine.

The solar chimney of the present invention has special storability of excess of energy by using fluid as a phase changing material.

DETAILED DESCRIPTION OF THE INVENTION

Figure 1:
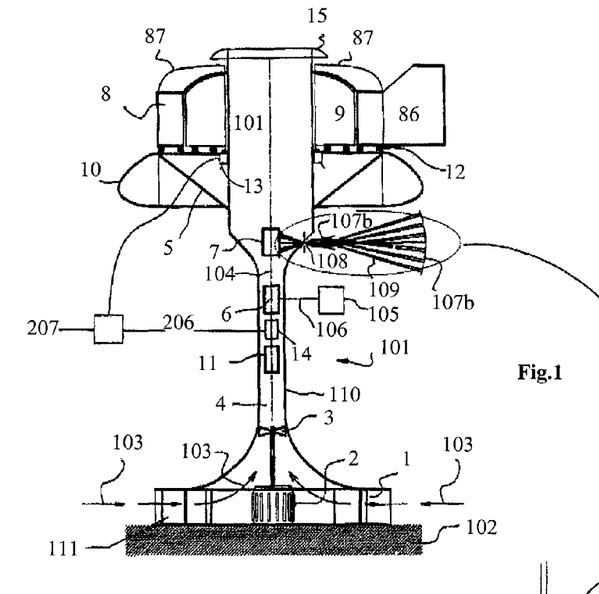
FIG. 1 provides a side elevational view, partly in schematic form, showing the solar chimney with external vertical axis wind turbine of the present invention.
Figure 2:
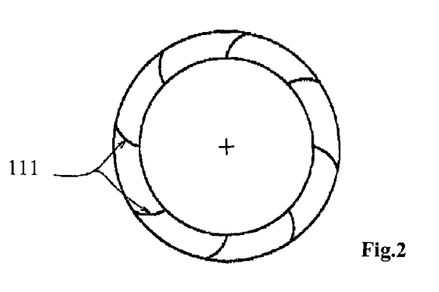
FIG. 2 provides a top view of set of vanes affixed to the ground.
Figure 3:
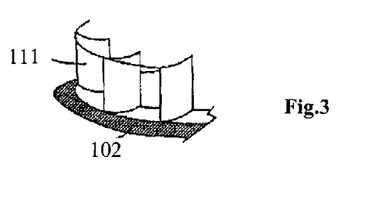
FIG. 3 provides a three-dimensional (3D) view of set of vanes affixed to the ground.

FIG. 1 provides a side elevational view, partly in schematic form, of the solar chimney of the present invention. The solar chimney 101 is mounted on the ground 102. The solar chimney includes base 1 which rests on the ground, or is rigidly affixed to the ground. FIG. 2 and FIG. 3 provide a top view and perspective view of set of vanes 111 affixed to the ground somewhat below the inlet. The vanes 111 enmeshing ambient air flow into the base, assisting the flow upward through the solar chimney, as indicated by arrows 103.

The air flowing upward through the solar chimney drives turbine 3, which is connected to gear box and electric generator 2. The turbine and generator are not necessarily shown to scale. The gear box and generator may be mounted inside or near the base. The gear box contains gears (not shown) which connect the turbine 3 to the generator. The generator could be replaced by some other machine that requires an input of mechanical energy.

As shown in FIG. 1, the solar chimney of the present invention has the general configuration of an hourglass. That is, the diameter of the solar chimney decreases to a narrow throat portion 4, and then increases as one proceeds upward.

The solar chimney therefore comprises an elongated chamber 110 having an inlet, near the bottom of FIG. 1, and an outlet, at the top of FIG. 1, the chamber defining a path for fluid, such as air, from the inlet to the outlet.

Air at ambient temperature, enmeshed by vanes 111 is sucked into the chimney by the updraft within the chimney, flow upward with increasing speed, toward the throat 4, due to 'venture' effect caused by the decreasing diameter, the throat comprises the most narrow portion of the solar chimney.

Air exiting the area of throat 4 is heated by heat exchangers disposed at or above the throat (these exchangers being described below). The heated air expands, and the increase in volume of the air is proportional to the increase in its temperature.

The air in the solar chimney is heated by heat exchangers 6, 7 and 14. The heat exchangers comprise means for heating the air in the chimney by solar energy and stored wind and stored solar energy in block diagram FIGS. 15 and 16. FIG. 1, heat exchanger 6 is connected, by suitable heat transfer conduits symbolized by line 106, to external solar collector 105. Heat exchanger item 7 receive solar energy (symbolized by line 109) which is solar radiation collected and concentrated by solar collector item 107a. Collected concentrated solar radiation may or may not be re-concentrated again by a secondary concentrator item 107b. Solar radiation rays converge to or near its point of convergence, i.e. focal point, enters the chimney structure through an aperture (item 108) on the chimney wall. After entry the rays diverge before impinging on item 7. Solar radiation is converted there to heat. Heat generated is transferred by the heat exchanger to air within the chimney, heating it. Item 7 therefore functions both as a solar collector and heat exchanger internal of the chimney. FIG. 1, heat exchanger 14 is connected by suitable heat transfer conduit symbolized by line 206 to external wind turbine energy storage 207.

Auxiliary burner 11 is a conventional (i.e.) non-solar heat source, which is used in the event that there is insufficient solar energy or wind energy on a given day. The burner 11 could be a gas burner, the condenser of an absorber heat pump system, or some other conventional heat source, which heats the air in the chimney instead of the solar collectors/heat exchangers 6 and 7 or wind energy storage 14.

Solar chimney—may also include direct energy conversion devices such as photovoltaic, thermoelectric and etc. These devices may be stationary i.e. attached to the vanes or torus or chimneys' outer surface, or may be movable. Incident radiation directed to such devices may or may not be concentrated.

Figure 12:
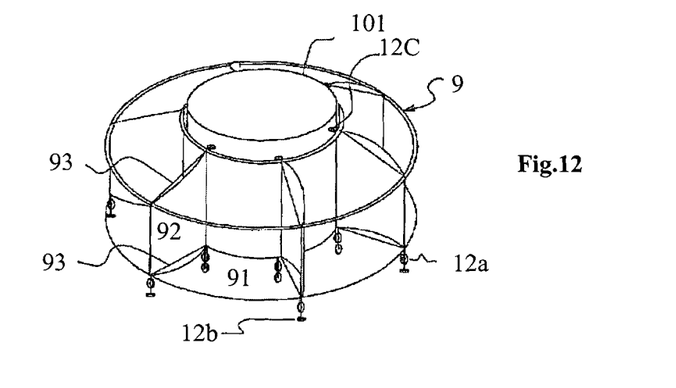
FIG. 12 provides a 3D view of an external vertical axis wind turbine of the present invention which positioned externally of the chimney.
Figure 13:
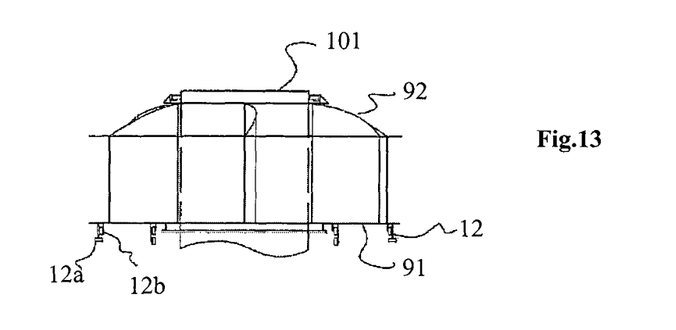
FIG. 13 provides a side view of an external vertical axis wind turbine of the present invention which positioned externally of the chimney.
Figure 14:
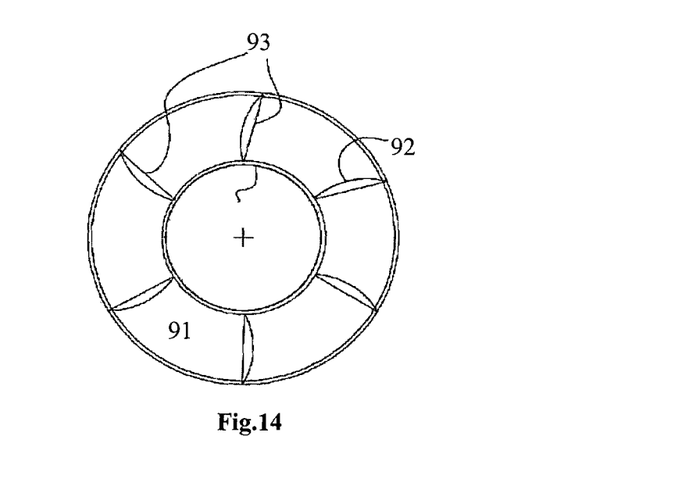
FIG. 14 provides a top view of an external vertical axis wind turbine of the present invention which positioned externally of the chimney.

FIGS. 12, 13 and 14.

A vertical axis wind turbine is positioned externally of the chimney. It is positioned below torus/vane 15 in FIGS. 1 and 9. The vertical axis wind turbine is comprised of two annular cylindrical cages, an outer annular cylindrical cage 8 and an inner cylindrical cage 9. The two annular cylindrical cages 8 and 9 are, generally at the same level; concentric with each other and also with the chimney.

Wheels 12a supporting the annular cylindrical cages 8 and 9, allows the cages to rotate freely on the circular rails/tracks 5a. The inner annular cylindrical cage 9 rotates only in one direction; whereas the outer annular cylindrical cage 8, can move in either direction. Pitch and roll is mitigated by rollers/wheels 12b and 12c. The inner cylindrical cage 9 is akin to the rotor of a turbine. It has blades 92 attached to frame 93. The frame 93 is attached at the top between the upper inner and upper outer ring of the annular cylindrical cage and at the bottom between the lower inner and lower outer ring of the annular cylindrical cage 9. The blades 92 which can be either rigid or flexible are hung between the frames 93. The flexible blades tend to assume a configuration best suited to extract energy from wind. Energy extracted from wind results in the rotation of the entire cylindrical cage 9, i.e. the wind turbine's rotor.

Figure 6:
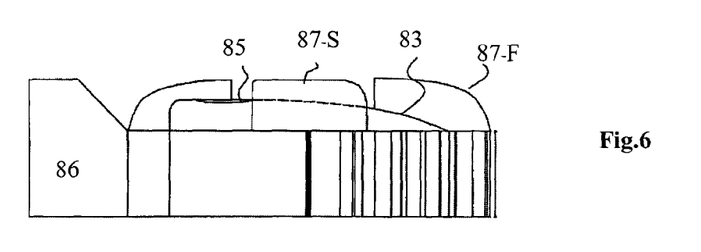
FIG. 6 provides a side view of outer annular cylindrical cage with dome shaped roof.
Figure 7:
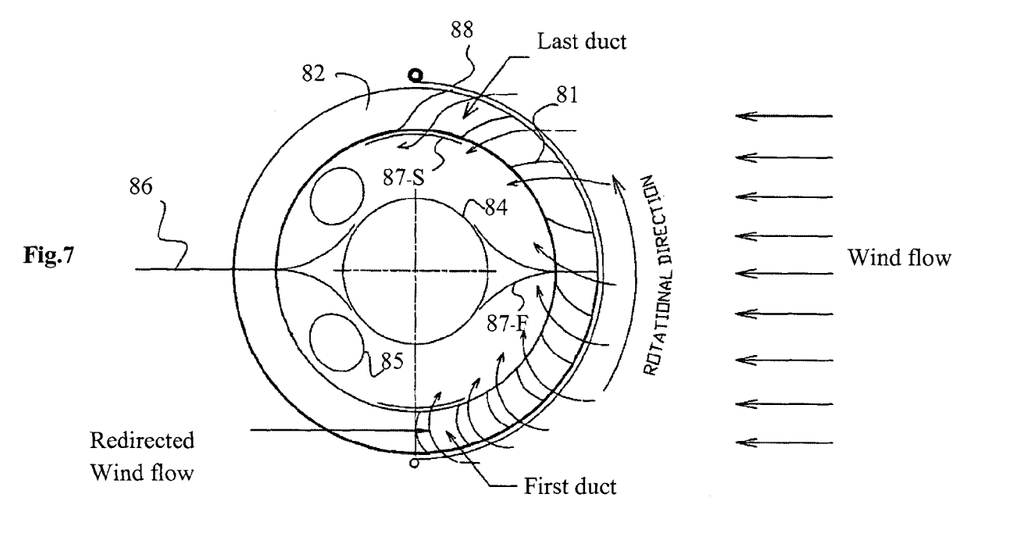
FIG. 7 provides a top view of outer annular cylindrical cage, vanes forming series of ducts, hole in the middle and direction of wind flows into the vanes/series of ducts.
Figure 8:
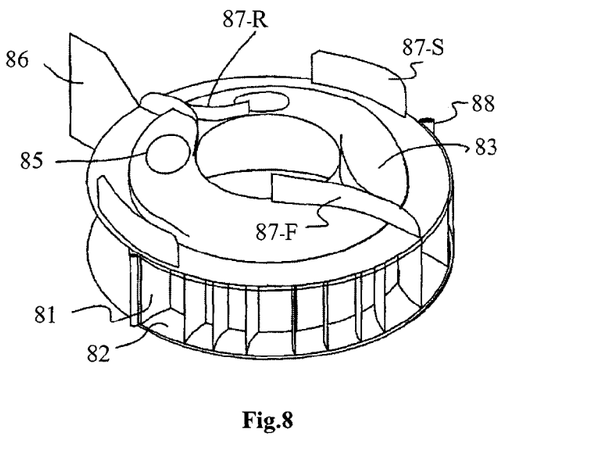
FIG. 8 provides a 3D view of outer annular cylindrical cage with structure of wind guided vanes, wind deflector and yaw mechanism.

FIGS. 6, 7 and 8

The outer annular cylindrical cage 8 has a wedge or ½ paraboloid of revolution surrounded by a flat ledged shape roof 83. Vanes 81 are affixed between the flat ledge on top and the circular band 82 below, forming a series of ducts. The ducts are curved differently depending on the curvature of the vanes, as shown in FIG. 7. Ducts on the break side, i.e. the side which wind flow direction is counter to the rotational direction of the wind turbine 9, serves to redirect oncoming wind flow direction. Redirecting wind flow direction result in wind impacting wind turbine blades 92 from behind, pushing it. Wind flow into subsequent ducts would meet increasing resistance from wind already captured by previous ducts, resulting in ever higher pressure and faster rotation of the wind turbine. The pressure is highest and rotation fastest as it passes the last duct in rotational direction. Wind flowing over the roof guided by wind guide 87-F, 87-S, 87-R result in a lowering of pressure over the area around aperture 85. Low pressure on the roof allows the venting of higher pressure wind trapped in the wind turbine as it rotate towards aperture 85. The push of the wind flow from the front and its forced venting in the rear i.e. low pressure area, result in a faster rotation than otherwise possible of the cylindrical cage 9 around aperture 84. The energy abstracted from the wind by the turbine is use to generate electrical power by generator 13.

The number, shape and size of aperture(s) 85 which may be variable, will be such as to provide the best venting.

Disposed around the outer annular cylindrical cage between the outer rim of the roof and outer rim of the circular band 82, a tubular screen or curtain 88 is attached. The curtain, normally rolled up, can be drawn over vanes 81 blocking airflow to the vertical axis wind turbine 8. Blocking wind flow to vertical axis wind turbine will cause its shut down. Repair, renovation can then proceed.

A Yaw mechanism steer the outer annular cylindrical cage, orienting the wind deflector 87-F to always face into wind. The yaw mechanism, 86 may be powered by wind, mechanically or electrically.

Figure 4:
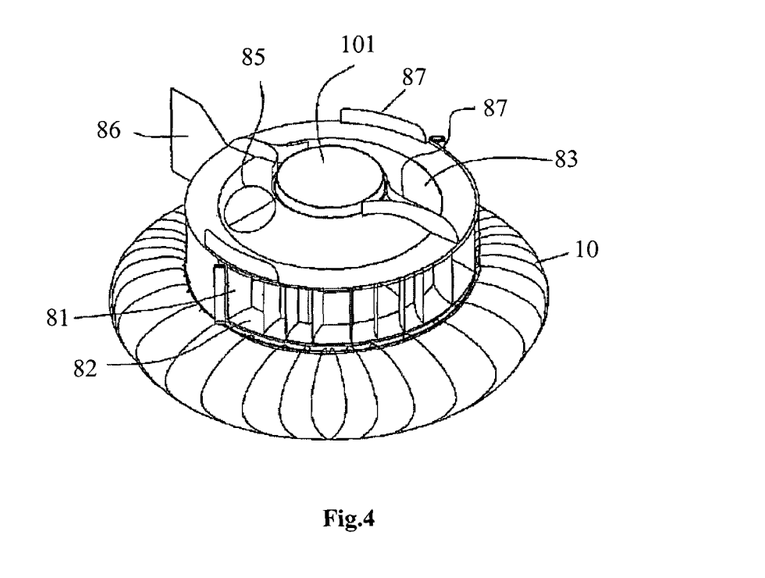
FIG. 4 provides a 3D view of inflatable torus disposed around the outside of the solar chimney below the outer annular cylindrical cage.
Figure 5:
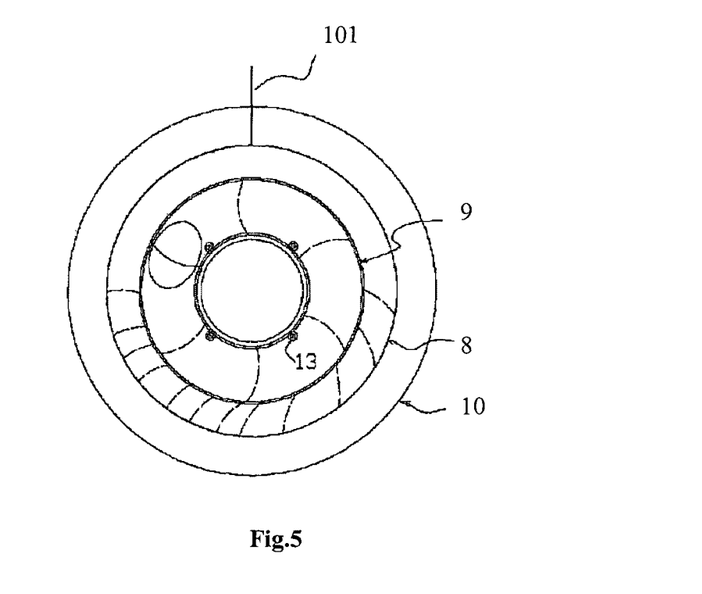
FIG. 5 provides a top view of inflatable torus disposed around the outside of the solar chimney below the outer annular cylindrical cage.

FIGS. 1, 4 and 5

Disposed around the outside of the solar chimney, somewhat below the outer annular cylindrical cage 8 is an expandable torus 10. The torus when inflated form a skirt surrounding the chimney. Wind that would otherwise impact the side of the chimney is deflected upward resulting in an increase in wind speed that can be captured as additional energy by the vertical axis wind turbine. The torus can be deflated when not require.

Figure 9:
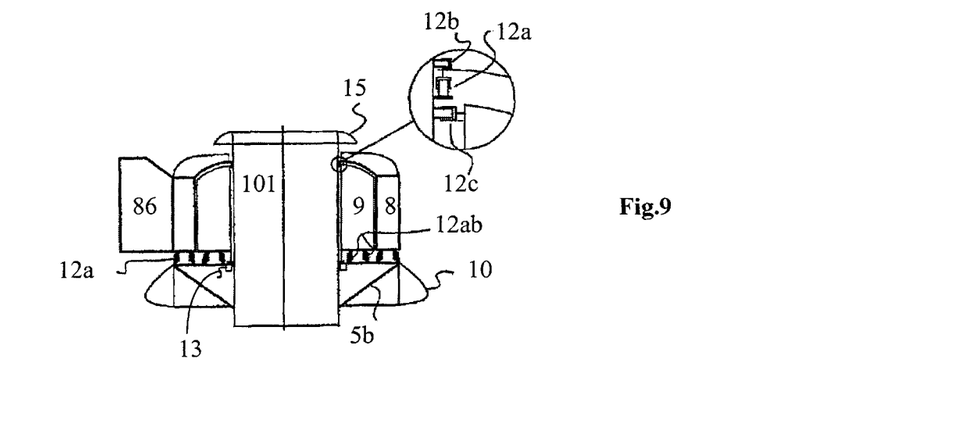
FIG. 9 provides a side view of top of chimney and skirt shaped torus around the outside of the chimney.

FIGS. 1 and 9

Positioned externally and near the top of the solar chimney is a torus or set of vanes 15. The torus or vanes form a skirt around the chimney deflecting wind upward combining with wind blowing across the top of the chimney. Deflected wind combining with wind blowing across the top of the chimney results in a higher wind speed environment. Pressure in such an environment would be lower than it would be otherwise. The lowering of pressure in the environment at the outlet of the chimney would provide additional suction to the air flowing upward through the chimney.

Figure 10:
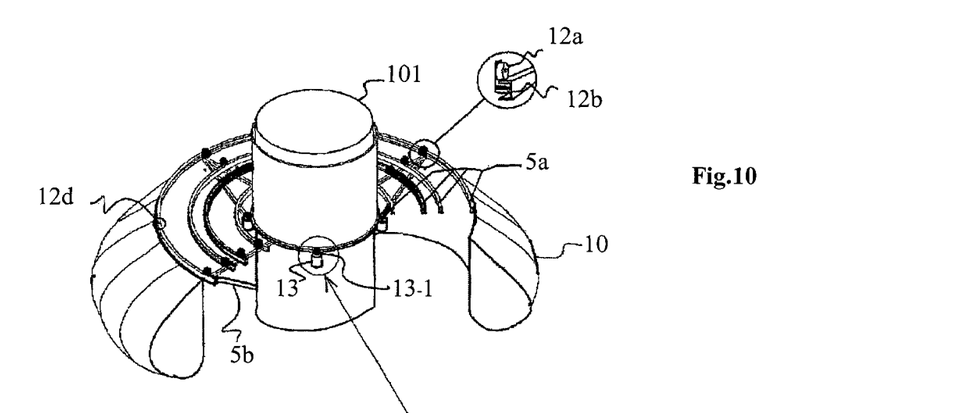
FIG. 10 provides a 3D view of stationery circular tracks on top of inflatable torus of the present invention.

FIG. 10.

5*a* represents stationary circular tracks. The tracks provide support for wheels or rollers of the outer annular cylindrical cage 8, wheels or rollers of the inner annular cylindrical cage 9 and torus 10. The tracks 5*a* are attached to and supported by brackets 5*b* which are attached to the wall of the solar chimney.

Figure 11:
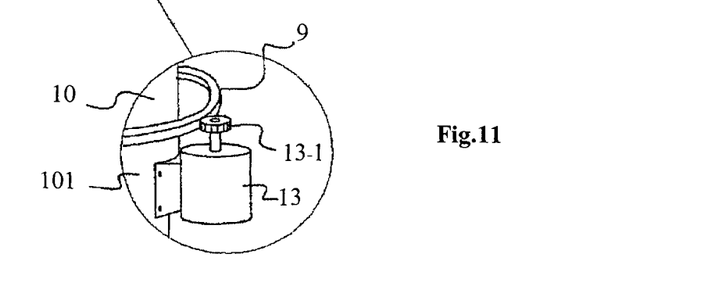
FIG. 11 provides an enlarge view of generator attached to solar chimney of the present invention.

FIGS. 10 and 11

Wind energy captured by the vertical axis wind turbine 9, rotates the entire annular cylindrical cage housing, i.e. the turbine. The rotational motion of the entire cylindrical cage represented by 9 in FIG. 11 is transmitted via the continuously variable transmission system 13-1 to generator 13, generating electric power. The generator 13 is attached to the wall of the solar chimney. Output controller 30, shown in block diagram FIG. 17, determines where it is to be routed. Continuously variable transmission system 13-1 in FIG. 11 ensures efficient conversion of mechanical to electrical energy. There may be more than one generator.

Figure 15:
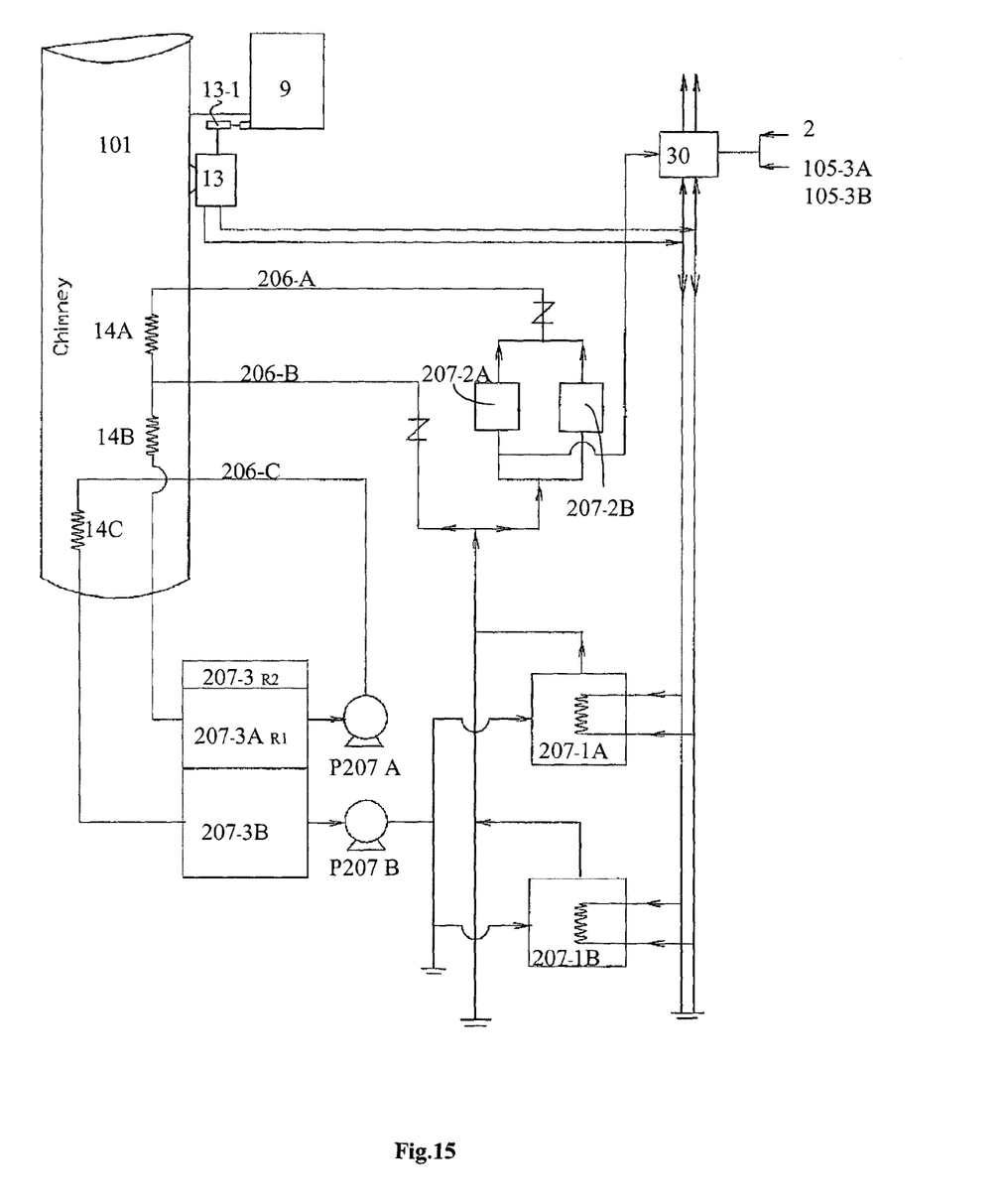
FIG. 15 is a block diagram detailing electrical energy (from wind) storage system of the present invention.
Figure 16:
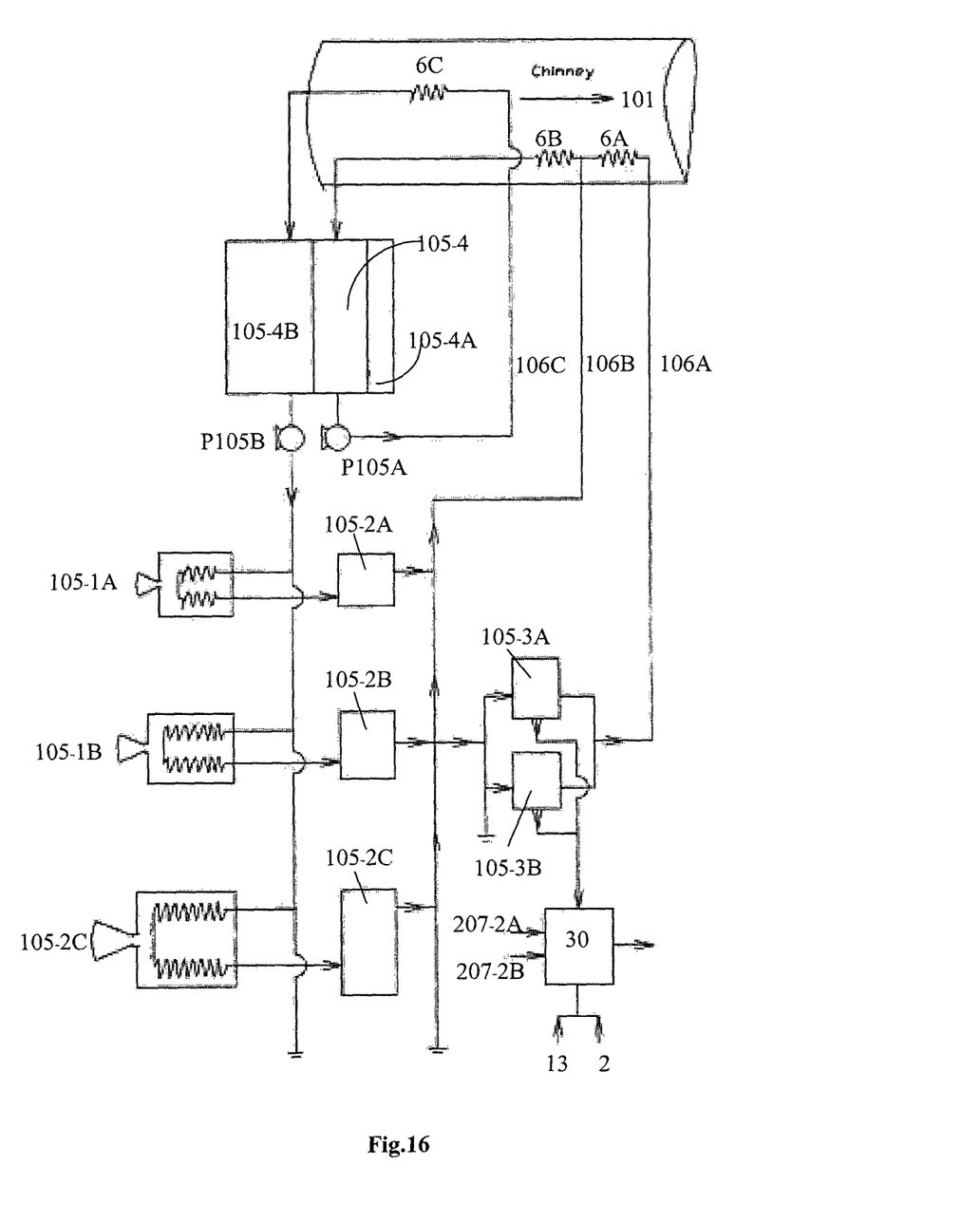
FIG. 16 is a block diagram detailing electrical energy (from solar thermal) storage system of the present invention.
Figure 17:
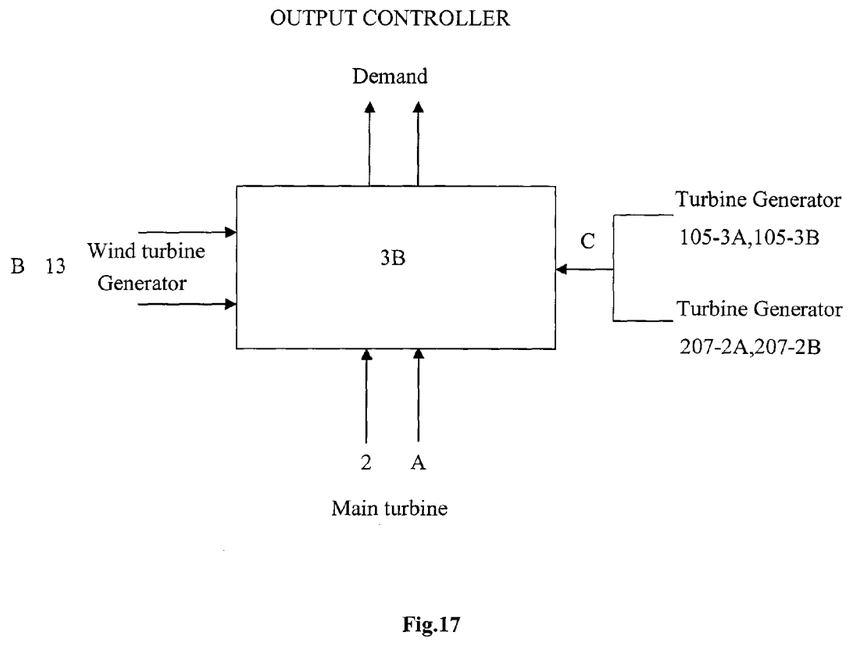
FIG. 17 is a block diagram showing energy available resources of the present invention.

FIGS. 15, 16, 17

The solar chimney has two systems for storing energy. One for electrical (from wind), the other for solar thermal. Storage capacity is independent of output power. Both systems are modular, external of chimney chamber, connected to heat exchangers inside the chimney by close looped conduit, and uses single and/or multi-phase heat transfer fluid. The two systems can also generate power independently or in conjunction with each other. Alphabet after item number denotes modularity.

Power production, from 2 and 13, in excess of requirement is stored in wind energy storage system 207-1A, B etc as shown in FIG. 15. Shortfall in production can be met by output from stored wind energy generator 207-2A, B in energy storage system 207-1A, B in FIG. 15 or from stored solar thermal generator 105-3A, B in solar thermal energy storage system 105-2A, B in FIG. 16 or both.

FIG. 15 and FIG. 17 are block diagrams detailing wind/electrical energy storage and retrieval. When electrical energy output is in excess of demand, output controller 30, in block diagram FIG. 17 diverts excess power to electrical heaters in 207-1A, B etc.

FIG. 15.

Electrical heaters in vessel 207-1A, B heat the heat transfer fluid, storing excess electrical energy in the process. The heating process converts some of the heat transfer fluid to vapour. The process can be carried out at high temperature and/or pressure. High temperature/pressure results in high energy density heat transfer fluid. The resultant vapour may be used to power turbine 207-2A, 2B generating electrical power when required. The vapour after giving up some energy in powering turbines, is conveyed to heat exchangers 14A within chimney 101, transferring some thermal energy to ambient air. The vapour from 207-1A, B may also be conveyed to heat exchanger 14B within chimney 101 directly or both to turbine and heat exchanger 14B. The heat transfer fluid vapour losing some heat condenses to a high temperature liquid or condensate, is conveyed to and stored in vessel 207-3A. The condensate in vessel 207-3A, may be pumped to heat exchanger 14C within chimney 101 where some of the thermal energy of the condensate is transferred to ambient air within the chimney 101: Heat Transfer fluid cooled by ambient air is piped to vessel 207-3B where it is pumped into vessel 207-1A and B to store excess electrical energy, thus repeating the process again. Vessel 207-3A and 207-3B may be same or separate vessel. Crucially, the liquids are physically and thermally separate from each other. R1 represent the floating roof that enables the physical and thermal separation of the hotter and cooler heat transfer fluid. R2 is the floating roof of the higher temperature fluid. Vessel 207-3 being the free board allowing for expansion.

System's components are modular. The system may also include heat pump technology in order to preheat the heat transfer liquids.

FIG. 16

A block diagram detailing solar energy collection, utilization and storage. Solar energy is collected by solar collector 105-1A, B, C, etc. and stored in storage vessels 105-2A, B, C, etc. The Solar energy collection, storage vessels and mechanical parts such as turbine generators 105-3A, B etc are modular. Being outside of chimney chamber, all components can increase in number or size or both, allowing output of the solar chimney output power to be scaled up.

Solar collector 105-1A, B, C, etc. collect solar radiation, converting it to heat. Heat collected is then transferred under pressure and high temperature to heat transfer fluid which is then stored in vessels 105-2A, B, C, etc. The heat transfer process being under pressure and at high temperature results in converting some of the heat transfer fluid to vapour.

The vapour from 105-2A, B, C, etc. may be conveyed to turbine 105-3A, B generating electrical power. The solar energy collector and storage system is connected to the heat exchanger inside the chimney by a close looped conduit. The vapour after giving up some energy in powering the turbine is conveyed by conduit 106A to heat exchanger 6A within chimney 101 transferring thermal energy to ambient air. The vapour from 105-2A, B, C, etc. may also be conveyed directly to heat exchanger 6B within chimney 101 or both to turbine 105-3A, B, etc. and heat exchanger 6B. The heat transfer fluid vapour after losing some heat condenses to a high temperature fluid or condensate, the condensate is conveyed to storage in vessel 105-4A. The condensate may be pumped to heat exchanger 6C within chimney 101 where it transfers some heat to ambient air. Vessels 105-4, 105-4A, 105-4B may be the same or separate vessel. Crucially the liquid is physically and thermally separate from each other. The cooled condensate conveyed to vessel 105-4B where it is the pumped to be heated in solar collector 105-1A, B, C, etc. then stored in vessel 105-2A, B, C, etc. The system may also include heat pump technology in order to preheat the heat transfer liquids.

The invention claimed is:

1. A solar chimney for capturing and storing solar and wind energy, comprising:
   a) an elongated chimney, and internal means for collecting solar radiation so as to heat air in the chimney to produce updrafts capable of performing useful work, the chimney having an inlet end and an outlet end,
   b) the chimney including an internal turbine positioned in a vicinity of the inlet end, the internal turbine being connected to drive an electrical generator, wherein the internal means for collecting solar radiation is located downstream of the internal turbine,
   c) a vertical axis wind turbine, mounted to the chimney in a vicinity of the outlet end of the chimney, the vertical axis wind turbine being connected to a second generator for producing electric power for heating a fluid,
   d) the heated fluid being used to drive an external turbine,
   e) wherein waste heat from the external turbine is connected to a first heat exchanger located within the chimney, and
   f) an external solar collector, located outside the chimney, the external solar collector being connected to heat a fluid, wherein the heated fluid is directed to another turbine, wherein waste heat from said another turbine is conveyed to a second heat exchanger located within the chimney.

2. The solar chimney of claim 1, wherein the vertical axis wind turbine is shaftless and comprises:
   g) inner and outer concentric cages mounted for rotation about a common vertical axis,
   h) the inner cage having a plurality of blades,
   i) the outer cage having a plurality of curved vanes, the outer cage being connected to a yaw or vane mechanism for orienting the outer cage in a specific direction relative to wind,
   wherein the vanes are curved so as to convey wind through the outer cage and then into the inner cage, such that wind impinges on the blades so as to push the blades in a constant direction.

3. The solar chimney of claim 1, further comprising a toroidal structure positioned in a vicinity of the outlet end of the chimney, the toroidal structure forming a skirt around the chimney for deflecting wind, and wherein the vertical axis wind turbine is positioned below the toroidal structure.

4. The solar chimney of claim 2, wherein the inner cage rotates in only one direction, and wherein the outer cage can move in either direction.

5. The solar chimney of claim 2, wherein the vertical axis wind turbine is connected to the generator by direct connection between a rim of the inner cage to a gear, the gear having a diameter which is smaller than a diameter of the inner cage.

6. The solar chimney of claim 2, wherein the outer cage has a wedge or half-paraboloid of revolution surrounded by a flat ledged shaped-roof.

7. The solar chimney of claim 6, further comprising, above the roof, a plurality of apertures and at least one wind guide.

8. The solar chimney of claim 2, wherein the chimney includes an expandable torus disposed around an outside portion of the chimney and below the outer cage.

9. The solar chimney of claim 2, wherein the cages are provided with wheels which engage stationary circular rails or tracks.

10. The solar chimney of claim 1, further comprising means for storing energy produced in the chimney.

11. The solar chimney of claim 10, wherein there are at least two energy storage systems, wherein said energy storage systems include a storage device for electrical energy produced from wind, and a second storage device for thermal energy produced by solar radiation.

12. A method of capturing and storing solar and wind energy, comprising the steps of:
   a) collecting solar radiation so as to heat air in a solar chimney, thereby producing updrafts in the chimney, the updrafts being harnessed for performing useful work,
   b) harnessing wind energy with a vertical axis wind turbine, mounted to the solar chimney, and using an output of the vertical axis wind turbine to generate electric power,
   c) using electric power generated in step (b) to operate an external turbine, and directing waste heat from the external turbine to a heat exchanger positioned within the solar chimney, wherein at least some of said waste heat is recycled to perform more useful work in the chimney,
   and further comprising storing energy produced in the chimney using at least two energy storage systems, located outside the chimney, and wherein the storing step includes storing electrical energy produced from wind in a first storage device, and storing thermal energy produced by solar radiation in a second storage device.

13. The method of claim 12, wherein step (b) includes operating an electric generator by a direct connection between a moving element of the vertical axis wind turbine and a gear connected to the electric generator.

* * * * *